US007810799B2

(12) United States Patent
McGloghlon

(10) Patent No.: US 7,810,799 B2
(45) Date of Patent: Oct. 12, 2010

(54) COLLAPSIBLE ENGINE TEST STAND

(75) Inventor: William P. McGloghlon, Orange, CA (US)

(73) Assignee: PRW Industries, Inc., Orange, CA (US)

( * ) Notice: Subject to any disclaimer, the term of this patent is extended or adjusted under 35 U.S.C. 154(b) by 408 days.

(21) Appl. No.: 11/496,354

(22) Filed: Jul. 31, 2006

(65) Prior Publication Data

US 2008/0023618 A1 Jan. 31, 2008

(51) Int. Cl.
*B23Q 3/00* (2006.01)

(52) U.S. Cl. .......................... 269/17; 254/134; 248/676

(58) Field of Classification Search .................. 269/17, 269/16, 56, 22; 254/134, 133 R; 248/676
See application file for complete search history.

(56) References Cited

U.S. PATENT DOCUMENTS 4,300,751 A * 11/1981 Delaney ..................... 254/2 R
4,334,668 A * 6/1982 Caris .......................... 254/8 B
4,932,628 A * 6/1990 Pacheco ..................... 248/676
5,048,806 A * 9/1991 Deutsch et al. ............. 269/152
5,851,007 A * 12/1998 Swartzlander et al. ........ 269/17

OTHER PUBLICATIONS http://search.brandson-sale.com, Engine Test Stand, p. 1, Mar. 12, 2007.
Winter/Spring 2005 Chrysler Performance Parts Catalog, p. 145-146.
Mighty Mount—The World's Best Engine Test Stand, Mighty Mount Accessory Store; www.mightymount.com, p. 1-10.

* cited by examiner

*Primary Examiner*—Lee D Wilson
(74) *Attorney, Agent, or Firm*—Snell & Wilmer L.L.P.

(57) ABSTRACT

A moveable, collapsible engine test stand having adjustable engine supports and additional accessory supports that are all collapsible adjacent the base of the stand for convenient, compact storage. The stand may include accessories such as a radiator, fuel tank, instrument panel, battery, cooling lines, fuel lines, wiring harnesses, engine dynamometer and the like to permit prolonged operation and monitoring of an engine.

16 Claims, 3 Drawing Sheets

COLLAPSIBLE ENGINE TEST STAND

FIELD OF INVENTION

This invention generally relates to engine test stands.

BACKGROUND OF THE INVENTION

Engine test stands serve to secure an engine block at a convenient height or position during testing and tuning processes and may also accommodate tear down and rebuild processes. Conventional stands secure the engine block from the ends using various bell housing mounts, engine mounts, or other mounting points. Such stands may allow for rotation of the engine block to provide convenient access to the lower portions of the engine. Other known stands may require removal of the engine from the stand to access the lower portions of the engine, for example, to remove the oil pan.

Known test stands typically include a broad-based frame for stability during engine operation and vertical posts with mounts for securing the assembled engine to the frame. Power, fuel, and coolant are connected to the engine for prolonged testing or break-in while various system parameters such as oil pressure and engine temperature may be monitored during operation. Similarly a dynamometer may be connected to the engine to record engine torque and horsepower ratings. For example, test stands allow for convenient detection and repair of leaks and adjustment of the valves, timing, and carburetor prior to installation of the engine in a vehicle.

Engine test stands are common at professional engine rebuilding shops, general mechanic shops, and residential garages where floor space is often limited. More compact stands are less stable while more stable designs are typically bulky. Such stands are often moveable on casters and thus may be rolled aside when not in use; yet continue to occupy a considerable footprint of otherwise usable shop space.

In some known stands, water is introduced at the water pump with a garden hose and disposed into a drain or onto the ground. In such partially-open systems, the water or coolant may cause considerable spray or puddling during testing and may not be recycled.

Accordingly, a need exists for a collapsible, compact, stowable engine test stand providing onboard or self-contained power, coolant, and instrumentation. Similarly, a need exists for an engine test stand providing increased engine stability, a closed cooling system, and a reduced storage footprint.

SUMMARY OF THE INVENTION

While the way that the present invention addresses the disadvantages of the prior art will be discussed in greater detail below, in general, the present invention provides a stable engine test stand frame with collapsible engine supports and collapsible accessory supports configured such that the frame and supports may be collapsed with minimal disassembly for storage. Thus, a sturdy, adjustable, self-contained engine test stand may occupy a fraction of the in-use footprint of the test stand when collapsed and stowed.

The engine stand of the present invention provides a stable frame with adjustable engine supports that are moveable to mount to different engine configurations and further moveable between an extended operable position and a compact stored position. The engine test stand also provides for self-contained or on-board power, fuel, cooling and diagnostics with supports for a battery, fuel tank, radiator, and instrument panel. The battery support, radiator support, fuel tank support, and instrument panel support may be fixedly or moveably attached to the frame or engine supports.

In the exemplary context of testing a rebuilt engine, the engine test stand is unfolded and locked in an operational arrangement. The engine supports are adjusted for and mounted to the engine. A transmission support or engine dynamometer adaptor may also be used if needed. Various accessory supports are positioned for use and a radiator, fuel tank, and battery are secured by the respective supports on the engine test stand. Gauges on an instrument panel are connected to the engine for monitoring various performance parameters.

Following completion of testing, the engine is removed and the engine stand may be collapsed and stored. In various embodiments, the radiator, fuel tank, and instrument panel may remain safely on the folded stand in storage. Alternatively, any of these accessories may be removed prior to collapsing the stand. The various support components remain secured to the frame during storage and are easily extended and collapsed as needed without the need for major disassembly.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION

Figure 1:
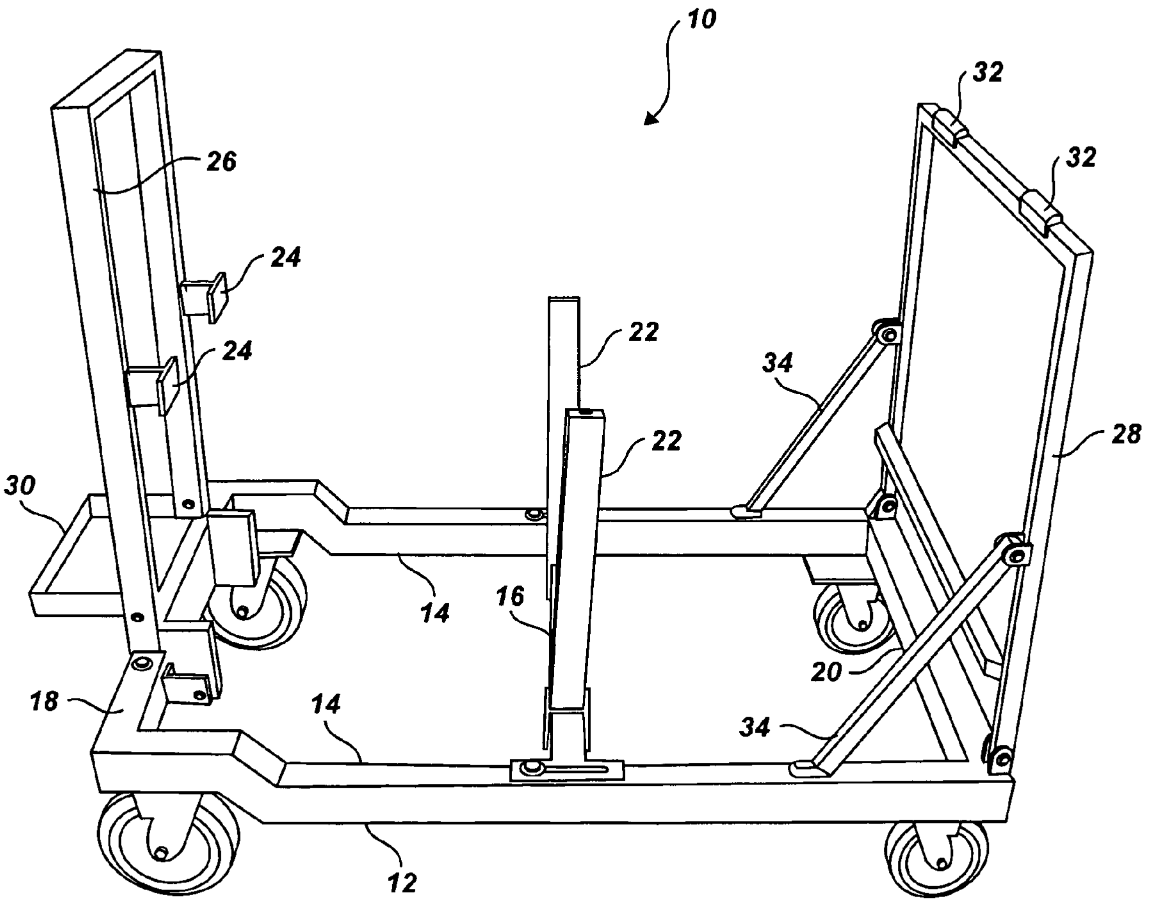
FIG. 1 illustrates an exemplary engine test stand in an operational position according to an embodiment.

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, accessories and the like and still fall within the scope of the invention. Thus, the detailed description herein is presented for purposes of illustration only and not of limitation.

A collapsible engine test stand may include adjustable engine supports and various accessory supports. The engine supports and various accessory supports are individually or jointly moveable between an operational position and a collapsed position. The invention may be used to repair, rebuild, and test engines.

The term "engine," as used herein, may be construed to mean any internal combustion engine have any number of cylinders. The term "frame," as used herein, may include any structure that provides sufficient stability and strength to support an engine and various peripheral systems including, for example, power, fuel, cooling, and instrumentation devices or systems. The term "support," as used herein, may include any structure suitable to withstand the loads generated by the supported object. The frame and various supports may include welded or fastened connections. The frame, engine supports, and various other supports are preferably of metal or aluminum construction and of sufficient strength to withstand the forces of the respective loads during operation of a fully-assembled engine, engine-transmission, or engine water brake dynamometer combination. That being said, suitable frame components and supports may be of any shape or size and in general, may include any material selected to provide an adequate factor of safety.

The frame may include a pair of spaced side-rails and cross-members connecting the ends of the side-rails. A third cross-member may be moveable along the central regions of the side-rails and carries one or more engine supports moveable along the cross-member to provide adjustability in at least one direction for mounting of different engines. An engine support and a radiator support may be pivotally attached to the cross-members at opposite ends of the frame and may be foldable towards the center of the frame into a parallel overlapping arrangement. Of course, any of the supports described herein may be mounted so as to be foldable in either direction or otherwise moveable to lay substantially parallel to the frame for storage. Various accessory supports such as a battery tray or fuel tank strap may be attached to and foldable against an engine support or radiator support. The various supports are independently or jointly moveable relative to the frame between operational positions and stored positions and a number of engine supports are preferably lockable in at least the operational position.

For example, a battery support tray may be pivotally attached to an engine support to hold a battery in a first position and to fold against, along, or in alignment with the engine support when not in use. Alternatively, the battery support may be fixed along a side-rail or cross-member of the frame. The various supports may be associated with the frame, engine supports or other supports in any suitable manner.

Any number of frame and support member arrangements may provide compact overlaying or nesting of components in the stored position. For example, the frame may be tiered and the different supports attached to different tiers such that the supports fold into a substantially parallel position along the frame. Alternatively, the frame may be substantially planar and the attachment points of the various supports or the supports themselves may be adjusted to coordinated compact storage of the various supports. For example, one support may be attached and stored between the frame members while another support may be attached and stored along the top or bottom of the frame members. Alternatively or additionally, one support may be substantially linear, and another may include an offset or bend to accommodate parallel stacking of the supports if mounted at substantially similar heights on the frame.

One or more central engine supports may be moveable to a stored position between two side-rails of the frame, a radiator support hinged at the front of the frame may be foldable along the top of the side-rails and an engine support hinged at the rear of the frame may be foldable over the radiator support. Thus, the engine test stand may be collapsed to at least the combined thickness of the frame, radiator support and engine support. The stand may be further compacted by movement or detachment of any casters or additional supports. For example, a battery support attached to the foldable engine support may first be folded against or within the engine support prior to folding of the engine support. Similarly, the fuel support or the instrument panel may be collapsible relative to any supporting structure to which they are attached.

Various supports may be foldable and others detachable for more compact storage. For example, the radiator support and end engine support may be foldable while a central engine support may be detachable for repositioning for storage. Alternatively, the various frame members to which the supports are attached may be moveable. For example, a central frame cross-member may be rotatable between the frame side-rails to move central engine supports fixed to the central cross-member into a stored position between the side-rails.

Accordingly, the invention provides for a frame with adjustable, collapsible engine supports, and various folding accessory supports to provide a sturdy engine test stand that is readily collapsible for compact storage.

With reference now to FIG. 1, an exemplary engine test stand 10 according to an embodiment of the invention may include a frame 12 having spaced side-rails 14 and cross-members 18 and 20 connecting the ends of side-rails 14. Side-rails 14 may be substantially straight, tiered, curved, or of any similar configuration providing suitable stability. Side-rails 14 are shown here with an offset at one end to accommodate larger casters at one end of frame 12 for easier rolling of stand 10 and a supported engine.

A central cross-member 16 may fit between side-rails 14 and may be moveable along a central range of side-rails 14 to accommodate varied engine mount positions and engine sizes. Central cross-member 16 is shown here with slotted brackets providing stepped movement to mounting holes along the top of side-rails 14 and sliding movement within each step. It is understood that any suitable means of providing for adjustment of central cross-member 16 may be used.

Central engine supports 22 may extend upwardly from central cross-member 16 and may be moveable along central cross-member 16 to accommodate varied spacing between engine mounts. Central engine supports 22 are further moveable or collapsible between the extended position shown and a collapsed position aligned between side-rails 14. Central engine supports 22 may be collapsible by momentary removal from the top of central cross-member 16 and reattachment to the side of central cross-member 16. In other embodiments, central engine supports 22 may be rotatable on central cross-member 16 or central cross-member 16 may be rotatable between side-rails 14 to collapse central engine supports 22 for storage. Central engine supports 22 are shown here with mounting holes on various surfaces of central engine supports 22 but may include any number of holes, brackets, or additional support sections to accommodate various engine mounts.

Secondary engine supports 24 may be pivotally attached to cross-member 18 and are preferably coupled together to provide increased rigidity. Secondary engine supports 24 provide additional engine mounting points thereby increasing the stability of the engine on stand 10. Secondary engine supports 24 are shown here as including mounting plates extending outward from the vertical body of secondary engine supports 24. Similarly, secondary engine supports 24 may be combined into a single support 24 or a forked support or any other suitably stable configuration. It is understood that engine supports 22 and 24 may include any number of vertical, horizontal, angled, or curved sections to suitably connect an engine to frame 12. Accordingly, secondary engine supports 24 may be adjustable to accommodate varied engine, transmission, or dynamometer mounting points using any means now known or later developed in the engine stand art.

Secondary engine supports 24 may be jointly foldable inward towards central cross-member 16 into a collapsed position. Secondary engine supports 24 are shown here as pivotally connected to the inside surface of cross-member 18 and include an offset to position secondary engine supports 24 squarely over cross-member 18 for additional stability. The offset further serves to position secondary engine supports 24 substantially parallel over the frame or other collapsed supports, such as a radiator support 28. Absent the offset, in the context of the particular pivot positioning shown, secondary engine supports 24 would not collapse completely against frame 12 but would be propped up somewhat because of the relative position of the pivot and central cross-member 16. Thus, the pivot position of any collapsible support described herein, or the shape of the support itself may be adjusted to achieve optimum arrangement of the supports for storage.

Secondary engine supports 24 may provide a fuel tank support 26. Fuel tank support 26 is shown here as a tower having a perimeter within which a fuel tank may be secured, however, fuel tank support 26 may be any suitable strap, tray, basket, threaded mounting points, or the like.

A battery support 30 may be pivotally connected between secondary engine supports 24 and may be foldable between the secondary engine supports 24 during storage. Battery support 30 is shown here as a tray but may be any suitable strap, basket, shelf or the like. Battery tray may be folded between secondary engine supports 24 when a battery is not needed or for storage of stand 10.

A radiator support 28 may extend upwardly from cross-member 20 and may be lockable in the extended position. Radiator support 28 may be pivotally connected to cross-member 20 and may be foldable inward towards central cross-member 16 into a collapsed position. Radiator support 28 is shown locked by angle braces 34 between radiator support 28 and side-rails 14, but may be locked by any suitable bracket, brace, pin, fastener or the like. Braces 34 may be connected to the sides of radiator support 28 and side-rails 14 to reduce the overall height of the collapsed stand 10. Alternatively, braces 34 may be collapsed and stored between radiator support 28 and side-rails 14. Radiator support 28 may be sized and positioned to collapse between central engine supports 22 or along the top or bottom of side-rails 14. For example, central cross-member 16 may be moved towards cross-member 18 to accommodate radiator support 28 between side-rails 14. Radiator support 28 may include upper and lower mounting points for attachment of a radiator and may further include a crossbar for additional support and convenience during attachment and detachment of the radiator.

Radiator support 28 may further include instrument panel brackets 32 for attachment of an instrument panel. An exemplary instrument panel may include an oil pressure gauge, tachometer, water temperature gauge and any other instrument or gauge useful in monitoring the performance of an engine.

Any of the supports described herein may be pivotally connected to frame 12 or to any other suitable support using any number of fasteners, brackets, interconnecting features, and the like. Thus, it is understood that any number or combination of pivotal or collapsible connections may be used between the various stand components described herein.

Figure 2:
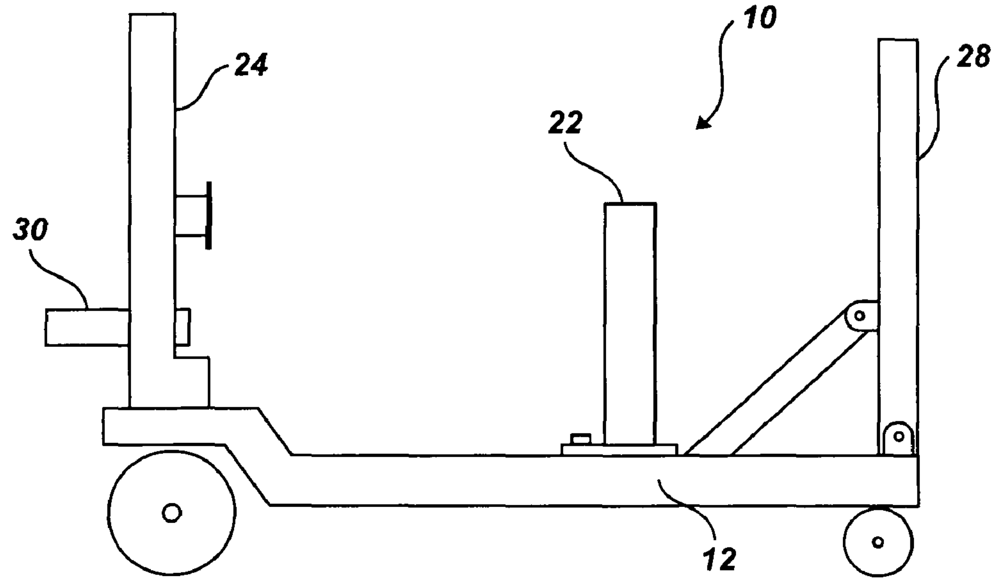
FIG. 2 illustrates a side view of the engine test stand of FIG. 1.

With reference now to FIG. 2, an exemplary stand 10 is shown with supports 22, 24, 28, and 30 in the extended operative position.

Figure 3:
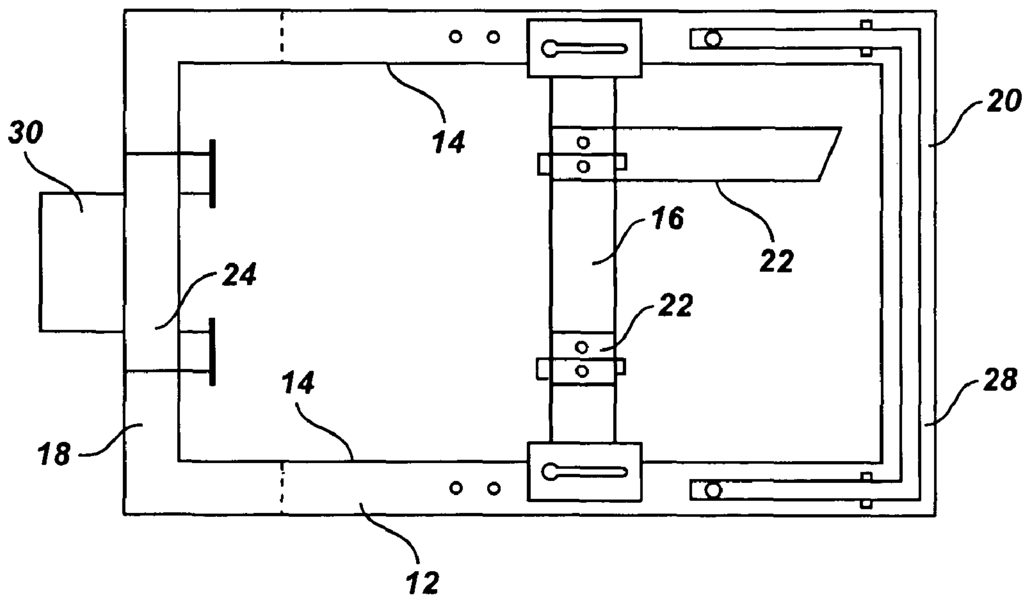
FIG. 3 illustrates a top view of the engine test stand of FIG. 1 having one of the engine supports collapsed for storage.

With reference now to FIG. 3, an exemplary stand 10 is shown with supports 24, 28, 30 and one of central engine supports 22 in the extended operative position and one of central engine supports 22 in the stored position. Central engine supports 22 may be moveable between the operative position and the stored position by movement of support 22 relative to central cross-member 16 or of central cross-member 16 relative to side-rails 14. For example, central engine supports 22 are shown here as including open ended brackets at the bottom end of central engine supports 22, the brackets extending over and past central cross-member 16 and secured in place with a bolt through the bracket beneath central cross-member 16. Thus, the bolt may be removed from the bracket, the central engine support 22 repositioned in the collapsed position with the bracket repositioned over central cross-member 16 and the bolt reinserted in the bracket to secure central engine support 22 in the collapsed position. Alternatively, side-rails 14 may include a post within central cross-member 16 and through-holes through both for locked alignment using a pin. The posts may be moveable along side-rails 14 for adjustment of central engine supports 22 for use or storage. Thus, central engine supports 22 may be collapsible and may be adjustable along and with central cross-member 16 by any suitable means.

Figure 4:
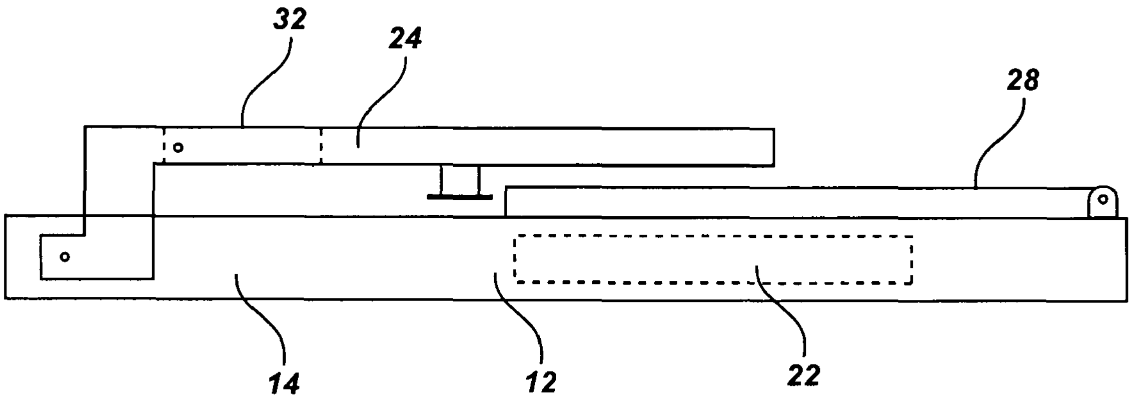
FIG. 4 illustrates an exemplary engine test stand in a collapsed position according to an embodiment.

With reference to FIG. 4, an exemplary stand 10 according to an embodiment is shown with central engine supports 22 collapsed between side-rails 14, radiator support 28 folded on top of frame 12 and secondary engine supports 24, along with stowed battery support 30, folded into the stored position over radiator support 28. Secondary engine supports 24 may be pivotally connected to frame 12 and may include an offset at the lower end such that secondary engine supports 24 fold over radiator support 28 and such that unfolding of secondary engine supports 24 brings them into contact with the top of frame 12 to provide additional stability.

Accordingly, the present invention provides a moveable, collapsible engine test stand having adjustable engine supports and additional accessory supports that are collapsible adjacent the base of the stand for convenient, compact storage. Various embodiments may include accessories attached to the stand such as a radiator, fuel tank, instrument panel, battery, cooling lines, fuel lines, wiring harnesses, and the like to permit prolonged operation and monitoring of an engine.

Similarly, while the invention has been described herein as having a generally rectangular base frame and generally vertical engine supports, any structure or means for stabilizing and supporting an engine may be used in accordance with the invention and any number of accessories may be readily used with the invention.

Finally, while the invention has been described above with reference to various exemplary embodiments, many changes, combinations and modifications may be made to the exemplary embodiments without departing from the scope of the invention. For example, the various supports and collapsible connections may be implemented in alternative ways. These alternatives can be suitably selected depending upon the particular application or in consideration of any number of factors associated with the operation of the engine test stand. In addition, the techniques described herein may be extended or modified for use with other types of devices. These and other changes or modifications are intended to be included within the scope of the invention.

What is claimed is:

1. An engine test stand comprising:

a frame having first and second side rails and first and second cross-members connected to the first and second side rails;

a central cross-member attached between the first and second side rails, the central cross-member positioned between the first and second cross-members;

a plurality of engine supports having a mechanism which is removably attachable to the central cross-member, the plurality of engine supports configured to support an engine at an elevated position above the frame, the plurality of engine supports being moveable between and securable in a first elevated position and a second substantially horizontal collapsed position;

a radiator support positioned on the first cross-member, the radiator support having a pivoting mechanism to allow the radiator support to move between a first elevated position and a second substantially horizontal collapsed position; and a plurality of secondary engine supports positioned on the second cross-member, the plurality of secondary engine supports having a pivoting mechanism to allow the plurality of secondary engine supports to move between a first elevated position and a second substantially horizontal collapsed position.

2. The engine test stand of claim 1, wherein said plurality of engine supports comprise at least one of a pair of first central engine supports, a distal engine support, or a combination of central and distal engine supports.

3. The engine test stand of claim 2, further comprising at least two of a battery support, radiator support, fuel tank support, or instrument panel support moveable between a first operative position and a second stored position.

4. The engine test stand of claim 3, wherein said instrument panel support is attached to said radiator support, and further comprising a brace for maintaining said radiator support in at least one of said first operative position or said second stored position.

5. The engine test stand of claim 4, wherein said radiator support is disposed at a first end of said frame, said plurality of engine supports are disposed at an opposite end of said frame, said radiator support and said plurality of engine supports are substantially perpendicular to said frame in said operable position and moveable into an overlapping configuration substantially parallel to and proximate said frame in said second collapsed stored position.

6. A collapsible engine test stand comprising:

a frame having two opposing side-rails, the side-rails attached to one another by a first crossbar at a first end of the frame and a second crossbar at a second end of the frame;

a central cross-member attached to the side-rails in a location between the first end and the second end, the central cross-member positioned substantially parallel to the first crossbar and the second crossbar;

a plurality of central engine supports having a mechanism which is removably attachable to the central cross-member and extending upward from the central cross-member, the plurality of central engine supports configured to be moveable between an elevated position where the plurality of central engine supports are positioned substantially perpendicular to the side-rails and a collapsed position where the plurality of central engine supports are positioned substantially parallel to the side-rails;

a radiator support extending upward from the first crossbar and having a pivoting mechanism to allow the radiator support to move between an elevated position and a collapsed position where the radiator support is positioned adjacent to the side-rails; and a secondary engine support extending upwards from the second crossbar, the secondary engine support having a pivoting mechanism to allow the secondary engine support to move between an elevated position and a collapsed position where the secondary engine support is positioned adjacent to the radiator support.

7. The engine test stand of claim 6, further comprising a first brace and a second brace connecting each side-rail with the radiator support, each brace configured to be moveable between an angled elevated position and a collapsed position fitting between the radiator support and the side-rail.

8. The engine test stand of claim 6, wherein the radiator support is configured to be collapsed between the plurality of central engine supports.

9. The engine test stand of claim 6, wherein the radiator support is configured to be collapsed along a top portion of the side-rails.

10. The engine test stand of claim 6, wherein the plurality of central engine supports are configured to be moveable and securable along portions of the central cross-member.

11. The engine test stand of claim 6, wherein the central cross-member is configured to be movable and securable along portions between the side-rails.

12. The engine test stand of claim 6, wherein the secondary engine support is configured to be collapsed in a position overlapping the radiator support.

13. A collapsible engine test stand comprising:

a frame having two opposing side-rails, the side-rails attached to one another by a first crossbar at a first end of the frame and a second crossbar at a second end of the frame;

a central cross-member attached between the side-rails in a location between the first end and the second end, the central cross-member positioned parallel to the first crossbar and the second crossbar;

a plurality of central engine supports pivotally connected to the central cross-member and extending upward from the central cross-member, the plurality of central engine supports configured to be moveable between an elevated position and a collapsed position where the plurality of central engine supports are positioned substantially parallel to the side-rails;

a radiator support pivotally connected to the first crossbar and extending upward from the first crossbar and having a pivoting mechanism to allow the radiator support to move between an elevated position and a collapsed position where the radiator support is positioned over the side-rails and in a direction toward the central cross-member;

a secondary engine support pivotally connected to the second crossbar and extending upward from the second crossbar, the secondary engine support having a pivoting mechanism to allow the secondary engine support to move between an elevated position and a collapsed position where the secondary engine support is positioned over the radiator support and in a direction toward the central cross-member; and a first brace and a second brace connecting each side rail with the radiator support, each brace configured to be moveable between an angled elevated position and a collapsed position where each brace fits between the radiator support and the side rail.

14. The engine test stand of claim 13, wherein in a collapsed position, the side-rails are positioned along a first plane, the radiator support is positioned along a second plane that is substantially parallel to the first plane, and the secondary engine support is positioned along a third plane that is substantially parallel to the second plane.

15. The engine test stand of claim 13, wherein the plurality of central engine supports are configured to be removed from a top portion of the central cross-member and re-attached to a side portion of the central cross-member.

16. The engine test stand of claim 13, wherein the secondary engine support includes an offset portion configured to be positioned over the second crossbar when the secondary engine support is in an elevated position.

* * * * *